(12) United States Patent  (10) Patent No.: US 7,412,103 B2
Moss et al.  (45) Date of Patent: Aug. 12, 2008

(54) 3D WAVELET-BASED FILTER AND METHOD

(75) Inventors: William C. Moss, San Mateo, CA (US); Sebastian Haase, San Francisco, CA (US); John W. Sedat, San Francisco, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 591 days.

(21) Appl. No.: 10/970,822

(22) Filed: Oct. 20, 2004

(65) Prior Publication Data

US 2005/0123216 A1 Jun. 9, 2005

Related U.S. Application Data

(60) Provisional application No. 60/513,062, filed on Oct. 20, 2003.

(51) Int. Cl.
*G06K 9/36* (2006.01)
*H04N 7/12* (2006.01)
(52) U.S. Cl. .................................. 382/240; 375/240.19
(58) Field of Classification Search ................ 382/240, 382/260, 276, 278; 375/240.19; 600/509, 600/515; 708/400
See application file for complete search history.

(56) References Cited

U.S. PATENT DOCUMENTS

| 6,070,133 | A | 5/2000 | Brewster et al. |
| 6,421,463 | B1 * | 7/2002 | Poggio et al. ............... 382/224 |
| 6,434,261 | B1 | 8/2002 | Zhung et al. |
| 6,567,081 | B1 | 5/2003 | Li et al. |
| 6,577,770 | B1 * | 6/2003 | Martin et al. ............... 382/240 |
| 6,597,739 | B1 | 7/2003 | Li et al. |
| 6,931,067 | B2 * | 8/2005 | Jang ...................... 375/240.19 |
| 6,976,046 | B2 * | 12/2005 | Guevorkian et al. ......... 708/400 |
| 7,082,327 | B2 * | 7/2006 | Houben ..................... 600/509 |
| 7,171,269 | B1 * | 1/2007 | Addison et al. ................ 607/7 |
| 2002/0107899 | A1 | 8/2002 | Masud et al. |
| 2003/0026479 | A1 | 2/2003 | Thomas et al. |
| 2004/0076234 | A1 | 4/2004 | Prieto et al. |

FOREIGN PATENT DOCUMENTS

| WO | WO 97/42592 | 11/1997 |
| WO | WO 01/69286 A2 | 9/2001 |
| WO | WO 02/057426 A2 | 7/2002 |

* cited by examiner

*Primary Examiner*—Kanjibhai Patel
(74) *Attorney, Agent, or Firm*—James S. Tak; John H. Lee

(57) ABSTRACT

A 3D wavelet-based filter for visualizing and locating structural features of a user-specified linear size in 2D or 3D image data. The only input parameter is a characteristic linear size of the feature of interest, and the filter output contains only those regions that are correlated with the characteristic size, thus denoising the image.

20 Claims, 6 Drawing Sheets

3D WAVELET-BASED FILTER AND METHOD

I. CLAIM OF PRIORITY IN PROVISIONAL APPLICATION

This application claims the benefit of U.S. Provisional Application No. 60/513,062 filed on Oct. 20, 2003, entitled "3D Wavelet-Based Filter."

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to image filtering, and more particularly to a 3D wavelet-based filter and process for denoising up to 3D image data based on a single, user-provided, characteristic linear size of a structural feature of interest, in order to produce a filtered image containing only those regions that are correlated with the characteristic size.

III. BACKGROUND OF THE INVENTION

The need to visualize and discern structural features in noisy image data (2D or 3D) is ubiquitous to virtually every type of data capture modality and application and is appreciated in many if not most scientific and technical disciplines. In modern biology, in particular, structural visualization is important to the study of chromosome structure and other sub-nuclear component structures of cells, and is made possible in part by the theoretical resolution of state-of-the-art light/electron microscopy (~50 nm/1.5 Å). At these high resolutions, however, practical limitations posed by the details of sample preparation and the methods used to acquire and process light and electron microscopy (EM) data produce noisy suboptimal images and complicate their interpretation, i.e. visualizing and discerning structural details and locations of features of interest in an image.

For example, the effective resolution of electron microscopy can be limited by the poor specificity of EM stains (non-specific staining). Uranyl acetate is a popular EM stain that forms complexes primarily with phosphates that are localized on DNA, RNA, and phosphoproteins. The consequence is that the acquired image is difficult to interpret, because it is a composite image of superimposed sub-images that contain every stained structure. This is analogous to determining the structure of an object buried in a cloud of nearly the same density material as the object. Interpretation difficulties are compounded if non-specifically stained structures are densely packed, which is typical for condensed chromosomes in a cell nucleus. Furthermore, nonspecific biological noise, detector noise (shot noise), EM microscope alignment uncertainties, and 3D tomographic data reconstruction noise may also contribute to the problem. Due to these factors, 3D EM cell structure cannot be interpreted unambiguously by direct visualization. Light microscopy also has similar and related problems to electron microscopy. Although the stains (especially fluorescent proteins) are spatially very specific compared to EM stains, the reduced specificity of low affinity antibodies may still produce a sizable background. And as in the EM data, densely packed structures compound the interpretational difficulties. Additional sources of noise, such as auto-fluorescence, high background due to pools of unassembled fluorescent proteins, and instrumentation can contribute to produce ambiguous results for 3D light microscopy cell structure studies as well.

Fourier methods (including matched filters) and other data analysis methods, such as correlation and model fitting, have been utilized to bring into view structural details and locations of the features of interest in an image. For Fourier methods in particular, difficulties can occur when there are few repeats of a given signal and much disorder at many angles, which can produce inconclusive results. While Fourier methods provide information about global frequency content (i.e. producing a frequency distribution that is peaked at the most commonly occurring frequencies), it does not provide information about the location of particular frequencies. Thus they are not particularly well adapted to picking out the non-repetitive, multiply oriented structures that comprise most biological data.

In contrast to Fourier methods, wavelet methods are known to be useful for extracting local frequency content, i.e. determining where particular sizes occur independent of how often they occur. A wavelet transform is a convolution of a user-selected wavelet kernel (a shape function) and the data, and can be generally expressed in the 1D case as:

$$W(x, a) = \int \Psi\left(\frac{x-x'}{a}\right) f(x') dx', \quad \text{Eq. (1)}$$

where f is the data signal that is convolved with the wavelet kernel function, $\Psi$. The only physical requirement for $\Psi$ is that a uniform signal of infinite extent produces no correlations, that is, $$\int \Psi((x-x')/a) dx' = 0.$$

Beyond this restriction, the choice of the wavelet kernel, $\Psi$, is arbitrary and is tailored usually to the particular problem of interest. The only major exception is for image compression and reconstruction applications (a mature application of wavelets), for which an orthonormal set of wavelets is desirable. A wavelet transform differs from a Fourier transform in the choice of $\Psi$. The kernel function for a Fourier transform ($\Psi(x')=\exp(ix'/a)$) has nonzero values that extend over the entire x' domain. Therefore W for the Fourier transform is only a function of (a). In contrast, the wavelet kernel, $\Psi$, for the wavelet transform is centered at x and is nonzero over a finite width, (a). It is this property of the wavelet kernel that produces frequency content as a function of spatial location. The wavelet transform, W, can be characterized as a correlation function, i.e. at each position, x, the correlation varies with the wavelet width (a), and is maximal for some value of (a). In other words, the wavelet transform shows how strongly the data correlates or is similar to the wavelet kernel at each location in the data.

Although wavelet theory rests on a well-established theoretical foundation, the mathematical complexity and rigor required for wavelet methods, particularly when analyzing 3D data, often requires specialized mathematical expertise that most scientists and researchers do not possess. An extension of Eq. (1) to 3D can be written as:

$$W^*(x, y, z, a, b, c) = \quad \text{Eq. (2)}$$
$$\int\int\int \Psi\left(\frac{z-z'}{c}\right)\Psi\left(\frac{y-y'}{b}\right)\Psi\left(\frac{x-x'}{a}\right)f(x', y', z')dx'dy'dz'.$$

The complexities in wavelet processing, however, arise from the methods used to evaluate Eq. (2). Since most problems to which wavelets are applied require computational speed, data compression, or data reconstruction, Eq. (2) is evaluated typically using the discrete wavelet transform (DWT), which is based on mathematically complex digital filtering methods. As stated above, image compression and reconstruction applications are best addressed using an orthonormal set of wavelets. Where data compression/reconstruction is not involved, however, the much simpler "continuous wavelet transform" (CWT) is preferably used which is a direct integration of Eq. (2).

In summary, there is a need for a greatly simplified and computationally fast wavelet-based filter and process for filtering image data to find features of a given size in any 2D or 3D dataset, and requiring no special expertise to use. This would preferably entail having a single input parameter which is a characteristic spatial size of the structure of interest, and whose output is a spatial image of correlation strength. In this manner, structural visualization of features and their locations in noisy image data may be achieved, such as condensed chromosomes in a cell nucleus, or images obtained from other applications, such as for example, medical imaging (e.g., bone structure), non-destructive evaluation (e.g., internal cracks and defects), airline baggage scanners, etc.

IV. SUMMARY OF THE INVENTION

One aspect of the present invention includes a method in a computer system for filtering 2D or 3D image data, comprising: providing a 3D continuous wavelet transform having a single unknown parameter which is a wavelet width, (a), necessary for transforming a dataset; receiving an input value for the wavelet width, (a); using the 3D continuous wavelet transform and the input value of the wavelet width, (a), to transform a set of up to 3D image data into a correlation image representing correlation strengths, with respect to the wavelet width, (a), as a function of spatial position; and graphically rendering the correlation image to be viewed by a user, whereby high correlation structural features may be discernable by the user in the correlation image.

Another aspect of the computer system for filtering 2D or 3D image data, comprising: means for receiving an input value for a wavelet width, (a); a 3D continuous wave transform component having a single unknown parameter which is a wavelet width, (a), necessary for transforming a dataset, wherein upon receiving the input value of the wavelet width, (a) the transform component is adapted to transform a set of up to 3D image data into a correlation image representing correlation strengths, with respect to the wavelet width, (a), as a function of spatial position; and means for graphically rendering the correlation image to be viewed by a user, whereby high correlation structural features may be discernable by the user in the correlation image.

And another aspect of the present invention includes an article of manufacture comprising: a computer usable medium having computer readable program code means embodied therein for filtering 2D or 3D image data, the computer readable program code means in said article of manufacture comprising: computer readable program code means for causing a computer to receive an input value for a wavelet width, (a); computer readable program code means for causing the computer to include the input value for the wavelet width (a) to a 3D continuous wave transform where only the wavelet width, (a), is unknown, and to use the 3D continuous wave transform to transform a set of up to 3D image data into a correlation image representing correlation strengths, with respect to the wavelet width, (a), as a function of spatial position; and computer readable program code means for graphically rendering the correlation image to be viewed by a user, whereby high correlation structural features may be discernable by the user in the correlation image.

V. BRIEF DESCRIPTION OF THE DRAWINGS

The accompanying drawings, which are incorporated into and form a part of the disclosure, are as follows.

VI. DETAILED DESCRIPTION

The present invention is generally directed to a 3D wavelet-based filter and method for filtering noisy image data (2D or 3D) and enabling the visualization and analysis of structural features therein. The filter uses a 3D continuous wavelet transform (CWT), expressed using three 1D wavelets, to convert the original image intensities into a transformed spatial image of correlation strengths. Though CWT is computationally slower than the previously described discrete wavelet transform (DWT), the CWT is used because it is much simpler and easier to interpret than the DWT, and allows very subtle information to be visualized due to its redundancy. The only input parameter to the filter is a characteristic linear size/dimension of a structural feature of interest, measured in voxels, to show only those regions having at least one physical dimension with a characteristic size. Thus the transformed spatial image produced by the filter is rendered and shown directly in correlation space, i.e. an image of correlation strengths at each spatial position, without having to transform back into real space.

Wavelet Kernel Selection, and Transform Operation for 1D Case

As discussed in the Background section, the general 1D continuous wavelet transform can be written as:

$$W(x, a) = \int \Psi\left(\frac{x-x'}{a}\right) f(x') dx',  \quad \text{Eq. (1)}$$

and the choice of the wavelet kernel, $\Psi$, is tailored to the particular problem of interest. Since the goal of the present invention is to identify structures of a particular size, and not image compression for which an orthonormal set of wavelets is desirable but complex, a particularly simple, non-orthonormal 1D representation of $\Psi$ is chosen that is easily extended to and used for the 3D case of the present invention as well. $\Psi$ is chosen as follows:

$$\Psi(\zeta) = \frac{1}{a} \quad \text{for } |\zeta| \leq \frac{1}{2} \quad \text{Eq. (3)}$$

and $$\Psi(\zeta) = \frac{-1}{2a} \quad \text{for } \frac{1}{2} < |\zeta| \leq \frac{3}{2}$$

where $\zeta=(x-x')/a$. And the normalization is chosen such that a signal of unit intensity and spatial extent (a) has a correlation of 1, independent of (a). The normalization is expressed as $$\int_{-a/2}^{a/2} \Psi(x'/a) dx' = 1.$$

Figure 1A:
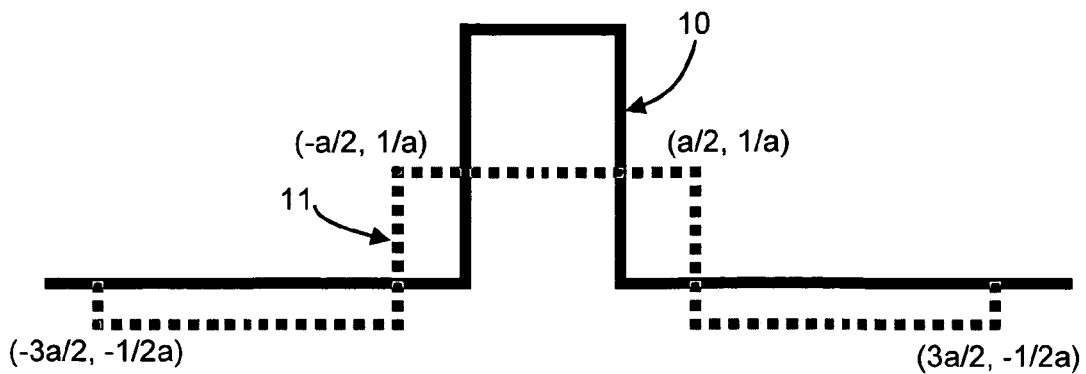
FIG. 1A is a schematic 1D representation of the correlation between a first wavelet filter and a 1D signal.
Figure 1B:
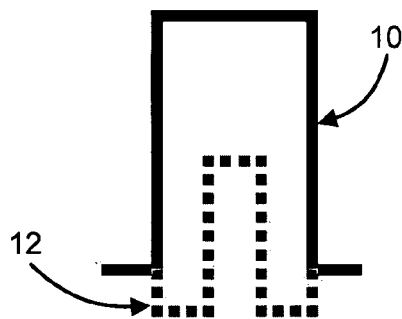
FIG. 1B is a schematic 1D representation of the correlation between a second wavelet filter and the 1D signal of FIG. 1A.
Figure 1C:
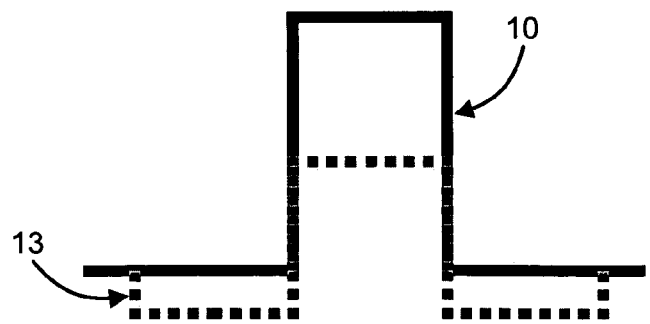
FIG. 1C is a schematic 1D representation of the correlation between a third wavelet filter and the 1D signal of FIG. 1A.

FIGS. 1A-C schematically show how Eqs. (1) and (3) are used in the 1D case, and illustrate the underlying general principles that are directly extendable up to the 3D case of the present invention. In particular, FIG. 1A shows a hypothetical signal 10 along a spatial axis, where the signal intensity is either zero or nonzero along the axis. A wavelet 11, shown in broken lines, is superimposed over the signal. As described in Eq. (3), the wavelet 11 has a uniform positive value (1/a) in a central region of extent (a), and a negative value (−1/2a) in two surrounding regions, each of extent (a). This is shown by four points plotted on the wavelet function 11:

$$\left(\frac{a}{2}, \frac{1}{a}\right); \left(\frac{3a}{2}, \frac{-1}{2a}\right); \left(\frac{-a}{2}, \frac{1}{a}\right); \left(\frac{-3a}{2}, \frac{-1}{2a}\right).$$

The integral of the wavelet over the spatial domain is zero. The wavelet transform, W(x,a) is obtained from Eq. (1) by (i) integrating the product of the wavelet kernel (Eq. 3) and the signal over the entire spatial domain, (ii) assigning the resulting correlation value to the spatial location of the center of the wavelet, and (iii) translating the wavelet over the entire spatial domain and repeating the integration at each location. In this manner, the 1D wavelet transform measures the strength of the correlation between the wavelet and the data, at each data point, and thus can be used to identify particular-sized structures by the locations/arrangement of the high correlation data points.

FIGS. 1B and 1C show the same signal 10 as in FIG. 1A, but with different sized wavelets (indicated as 12 in FIGS. 1B and 13 in FIG. 1C) superimposed thereon. Objects (i.e. the signal 10) that just fill or match the positive part of the wavelet produce maximum correlations (e.g. FIG. 1C). Objects that underfill the positive part of the wavelet produce smaller (weaker) correlations (e.g. FIG. 1A), because of the penalizing effects of the normalization. Objects that are larger than the wavelet also produce smaller correlations (FIG. 1B), because of the penalizing effects of the negative and zero-valued parts of the wavelet. In each case, the correlations determined at each spatial location of the object are associated with the spatial location. Logical consistency requires the data to be positive definite, which can be accomplished by preferably adding a constant intensity to all of the data values. While only three example wavelet sizes are shown in FIGS. 1A-C, it is appreciated that the wavelet size may be varied over all widths/scales, the transform repeatedly applied, and the graphically rendered results of the correlation strengths viewed each time.

3D Wavelet-based Transform

The 1D case above is now extended to the 3D case of the present invention. As in the 1D case, the 3D case uses the same choice of wavelet kernel, i.e. Eq. (3) as follows:

$$\Psi(\zeta) = \frac{1}{a'} \quad \text{for } |\zeta| \leq \frac{1}{2} \quad \text{Eq. (3)}$$

and $$\Psi(\zeta) = \frac{-1}{2a'} \quad \text{for } \frac{1}{2} < |\zeta| \leq \frac{3}{2}$$

where $\zeta=(x-x')/a'$ for the x-domain, $\zeta=(y-y')/a'$ for the y-domain, and $\zeta=(z-z')/a'$ for the z-domain. In general, a' does not have to have the same value in each dimension. In the x-domain, a'=a; in the y-domain, a'=b; in the z-domain a'=c. The normalization is chosen such that a signal of unit intensity and spatial extent (a') has a correlation of 1, independent of (a'), for each of the x, y, and z-domains. In the x-domain, for example, the normalization is expressed as $$\int_{-a/2}^{a/2} \Psi(x'/a) dx' = 1.$$

And as previously discussed, a general extension of Eq. (1) to 3D is expressed in Eq. (2):

$$W^*(x, y, z, a, b, c) = \quad \text{Eq. (2)}$$
$$\int \int \int \Psi\left(\frac{z-z'}{c}\right) \Psi\left(\frac{y-y'}{b}\right) \Psi\left(\frac{x-x'}{a}\right) f(x', y', z') dx' dy' dz'.$$

One serious problem associated with Eq. (2), however, is that two negative correlations (e.g., negative correlations in x and y) can combine to produce a positive correlation at a particular location. In addition, the desired invariance of the wavelet transform to rigid body rotations is broken by the typical Cartesian discretization of data that is required by Eq. (2). Consequently, Eq. (2) is modified in the present invention, as Eq. 4, so that false positive correlations do not occur and rotational invariance is accounted for:

$$\overline{W}(x, y, z, a, b, c, \phi, i) = H\left[\int \psi\left(\frac{z-z'}{c}\right) H\left[\int \psi\left(\frac{y-y'}{b}\right)\right.\right. \quad \text{Eq. (4)}$$
$$H\left[\int \psi\left(\frac{x-x'}{a}\right) R_i(\phi) f(x', y', z') dx'\right] dy'\right] dz'\right],$$

H[q] in Eq. (4) is defined as follows: H[q]=q for q>0 and H[q]=0 for q≦0, to produce only positive correlations. However, this results in $\overline{W}$ being dependent on the order of integration over x', y', and z'. Thus, the transform is symmetrized with respect to x, y, and z by defining $W_{SYM}$ in Eq. (5) as the average of $\overline{W}$ over all permutations of x, y, and z:

$$W_{sym}(x, y, z, a, \phi, i) = \frac{1}{6} R_i^{-1}(\phi) \sum_{\substack{x,y,z \\ perm}} \overline{W}(x, y, z, a, a, a, \phi, i) \quad \text{Eq. (5)}$$

As shown in Eq. 5, rotational invariance is addressed in the present invention by approximating rotational invariance by considering only cubical wavelets (a=b=c) and averaging over angles, where $R_i(\phi)$ is a rotation of $\phi$ radians around the i axis. Therefore, the 3D wavelet transform has at least partial invariance to rigid body rotations, e.g., the wavelet transform is able to identify spherically symmetric objects and cylindrically symmetric objects, independent of axis of symmetry. W(x,y,z,a) in Eq. (6) is the resulting (approximately) symmetric and rotationally invariant 3D continuous wavelet transform used in the 3D wavelet-based filter of the present invention, having a single unknown parameter, (a), preferably supplied by a user.

$$W(x, y, a, z) = \quad \text{Eq. (6)}$$
$$\frac{1}{4}(W_{sym}(x, y, a, z, 0, x) + W_{sym}(x, y, z, a, \pi/4, x) +$$
$$W_{sym}(x, y, z, a, \pi/4, y) + W_{sym}(x, y, z, a, \pi/4, z))$$

Figure 2:
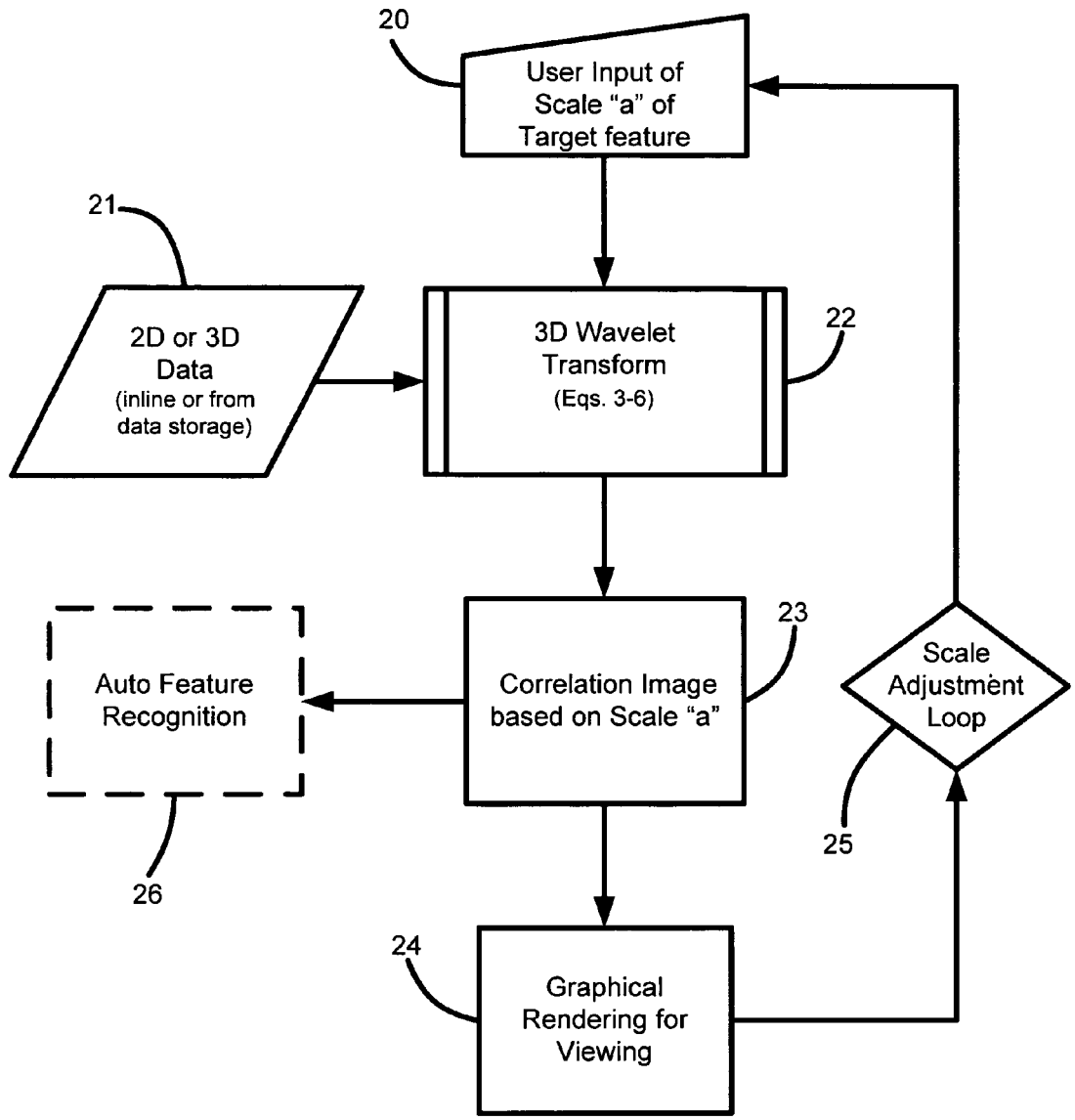
FIG. 2 is a high level flow chart showing an exemplary method of the present invention.

FIG. 2 shows a high level flow chart of an exemplary 3D (or 2D) data filtering process of the present invention using Eqs. 3-6 of the modified 3D wavelet transform. It is appreciated that the filter and filtering process of the present invention may be implemented in and via various types of computing systems and modalities, such as executable code in a computer system, as dedicated hardware, processing modules, I.C., etc.

At reference character 20, operation of the filter begins by receiving as input a value for the wavelet size/width, i.e. scale, (a). This is the only input parameter to the filter, and is a characteristic linear dimension of a structure feature of interest, measured in voxels. The value of (a) is preferably provided as manual input by a user, such that adjustments can be made to the value of (a) based on the user's interpretation/satisfaction of the displayed output. Alternatively, the value of (a) may be predetermined, such as a range of values suitable for a given target structure, and loaded as part of the data filtration process. In any case, the scale, (a), is passed into the 3D wavelet transform (Eqs. 3-6) module at reference character 22. 2D or 3D data is also passed to the 3D wavelet transform from box 21. It is appreciated that the data may be acquired in real time or accessed from data storage.

At step 22, the 3D wavelet transform processes the data of 21 according to Eqs. 3-6, to produce a correlation image in step 23, mapping correlation strength as a function of spatial position, for all positions represented in the data. And the correlation image is graphically rendered and displayed at step 24 for viewing by a user, such as on a display monitor. The 3D wavelet transform is designed to be used in correlation space, i.e. 2D or 3D data is filtered with a wavelet of size "n" voxels, and shows only those regions that have at least one physical dimension with a characteristic size of "n" voxels. Thus, the correlation image is not transformed back into "real" space, but rather graphically rendered for visualization by a user. And the filter can be used to visualize structures in any 3D or 2D data, not limited to any particular data capture modality or application, with the filtered data showing only the strength of the correlation between the data and the size of interest.

Using the CWT for the 3D wavelet filter causes feature enhancement to wax and wane smoothly as the wavelet size (a) changes. Therefore, if the feature's characteristic size is not known precisely a priori prior to filtering, it can still be detected with a non-optimal wavelet size, although not as strongly. The wavelet size can be adjusted subsequently to optimize the visualization of the feature of interest, as indicated at 25 in FIG. 2. The filter is normalized so that the results of using two different wavelet sizes can be compared directly. Thus, larger values at a particular point mean stronger correlations with the associated wavelet size. Additional methods to automatically determine/recognize (without prior knowledge) the dominant characteristic sizes in a data volume may also be used in combination with the present invention, as indicated at 26.

Any type of filtering has the potential to introduce artifacts. In order to address this issue, the original data should be routinely compared with the 3D wavelet-filtered data of the present invention to ensure that features that are enhanced by the filter are discernible in the original data. In addition, when it is possible, data may be obtained from the same sample, using independent methods (e.g., EM, if the original data were optical), to confirm the structural identifications. Nevertheless, some artifacts are unavoidable. For example, the mathematical structure of wavelets, in general, makes them excellent edge detectors. The 3D wavelet-based filter of the present invention may act as an edge detector when the wavelet size (a in the defining equations) is small compared to the feature of interest. While edge detection and enhancement is not necessarily bad, it can result in a disc appearing as a ring, or a solid ribbon-shaped structure appearing as a pair of thin solid ribbons. Filtering with multiple wavelet sizes can usually resolve these anomalies, and should be done as a matter of course if only to avoid missing interesting previously unknown features in the data.

EXAMPLES

Figure 3:
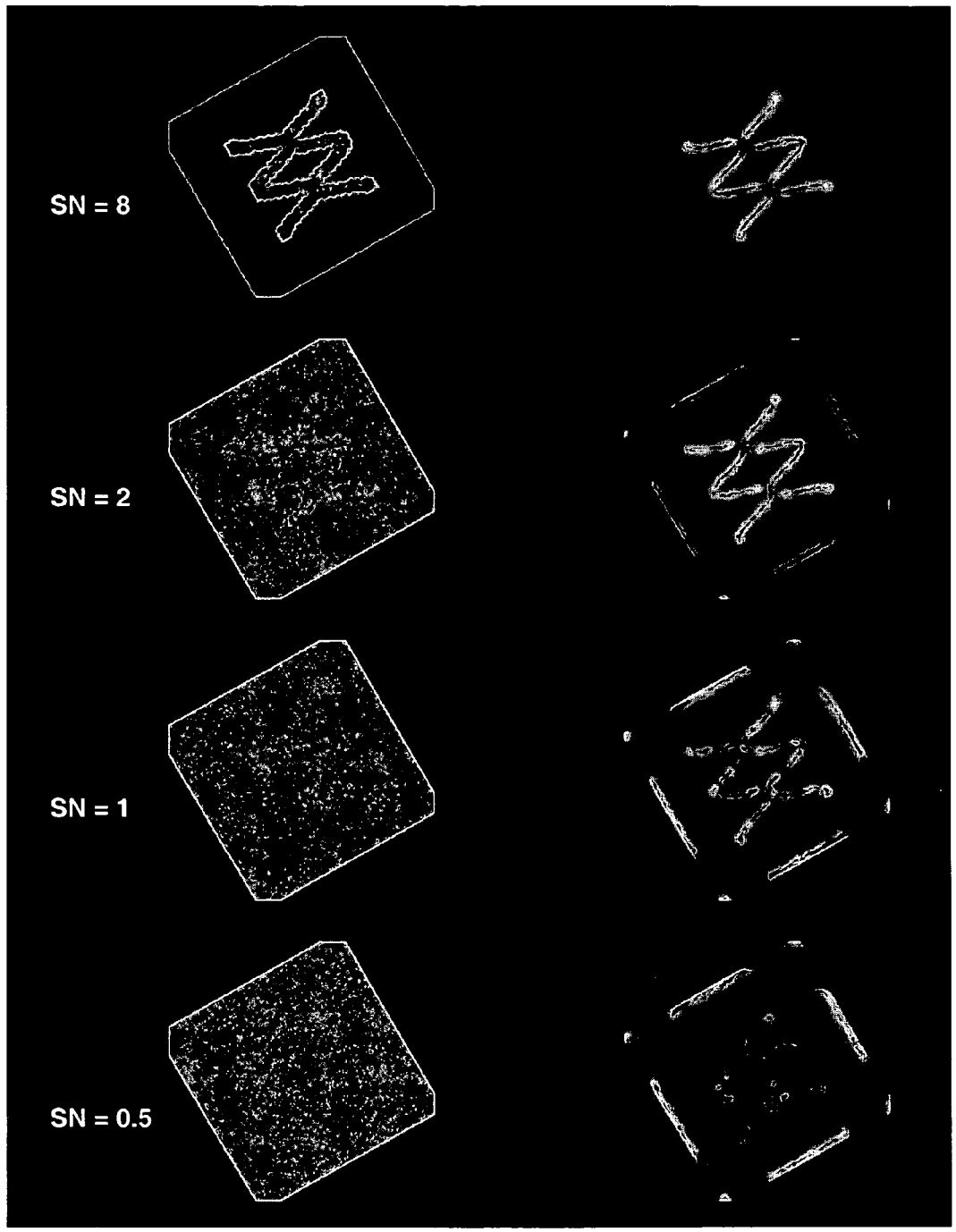
FIG. 3 is a set of data images illustrating the 3D wavelet filtering of two helices embedded in noise, for various signal-to-noise ratios.
Figure 4:
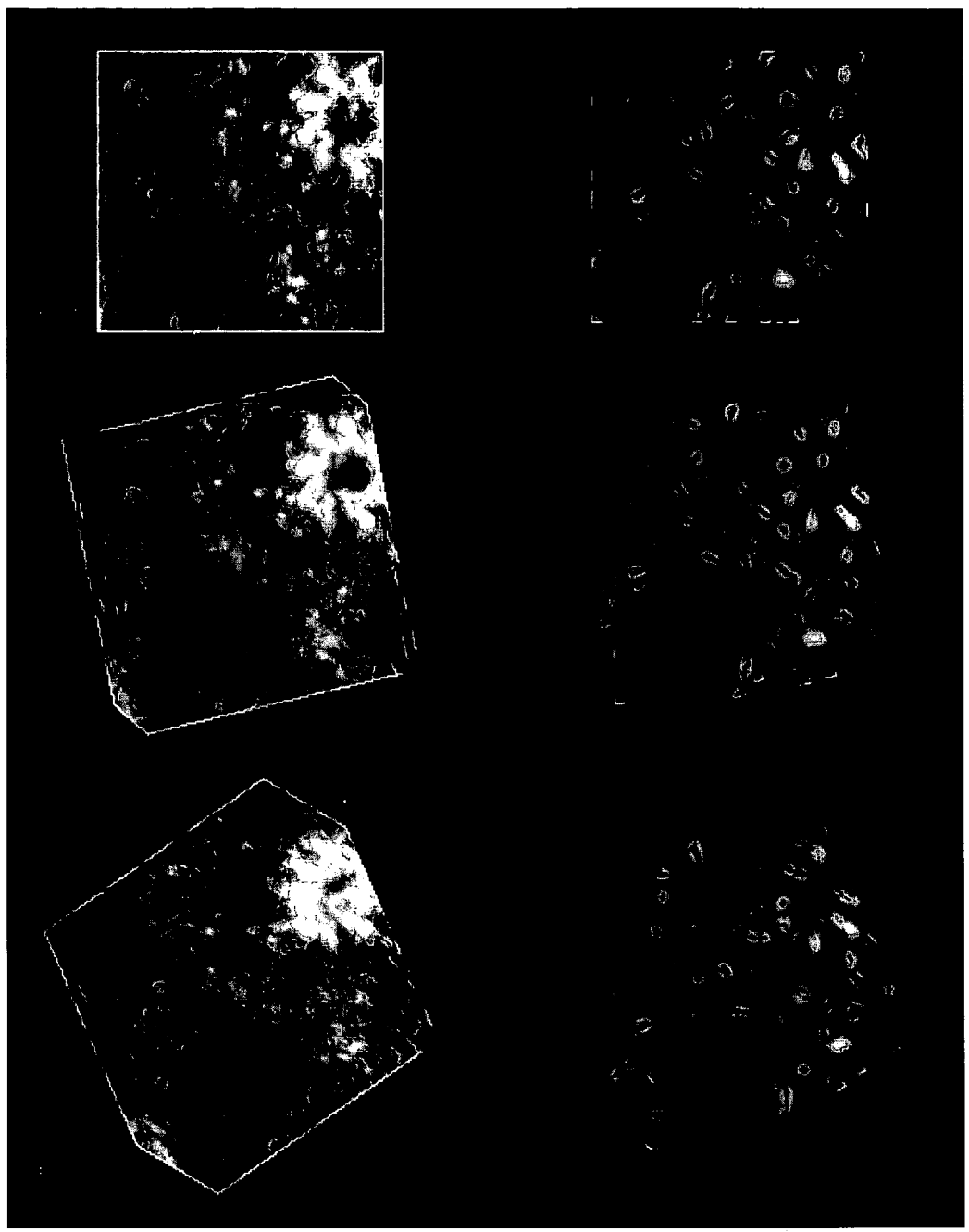
FIG. 4 is a set of data images illustrating the 3D wavelet filtering of microtubules and centriole, for various viewing angles.
Figure 5:
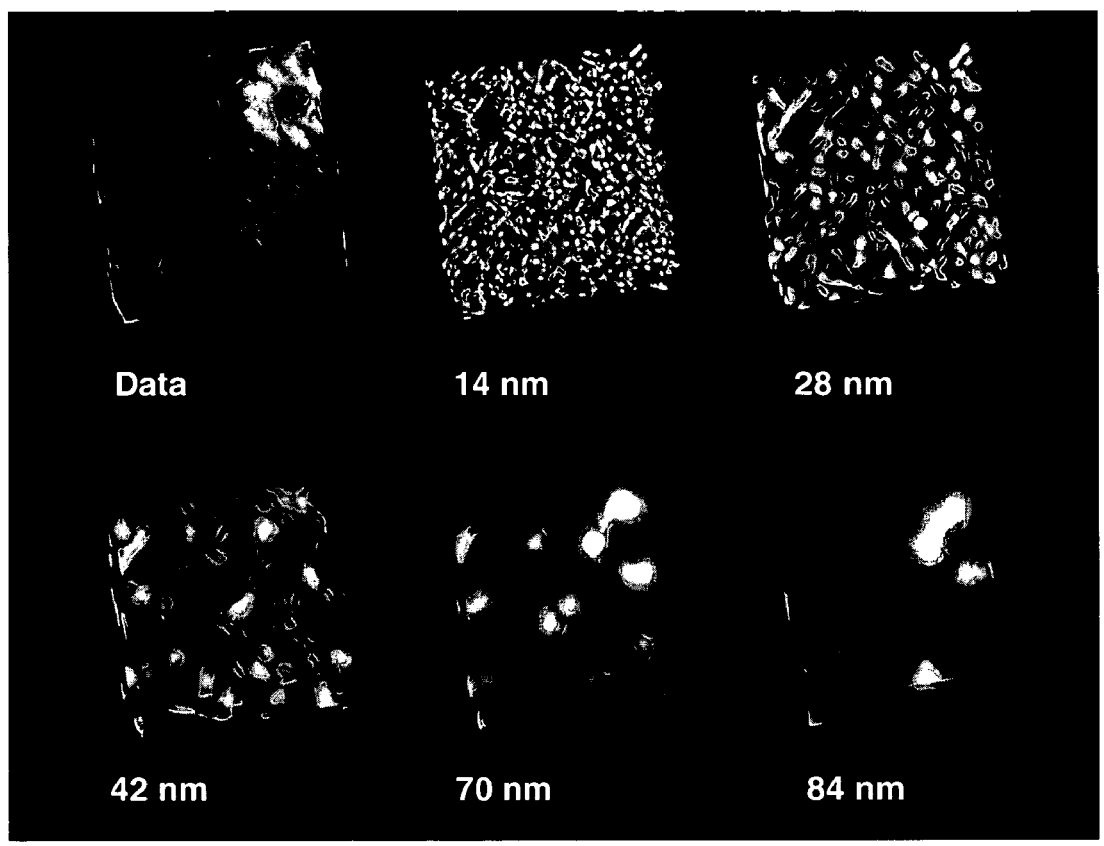
FIG. 5 is a set of data images illustrating the 3D wavelet filtering of microtubules and centriole as a function of wavelet spatial scale.
Figure 6:
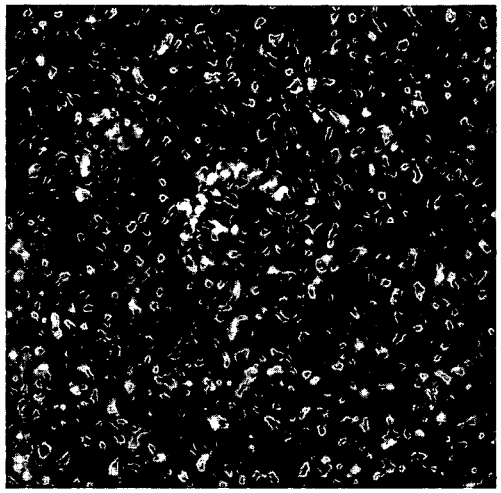
FIG. 6 is a set of data images illustrating the 3D wavelet filtering of a gamma-tubulin ring complex (gturc).
Figure 6:
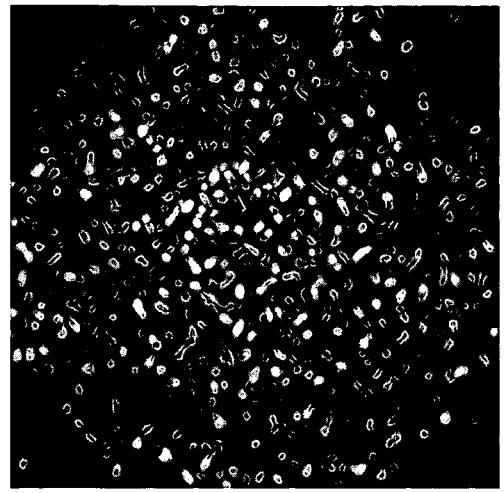
Figure 6:
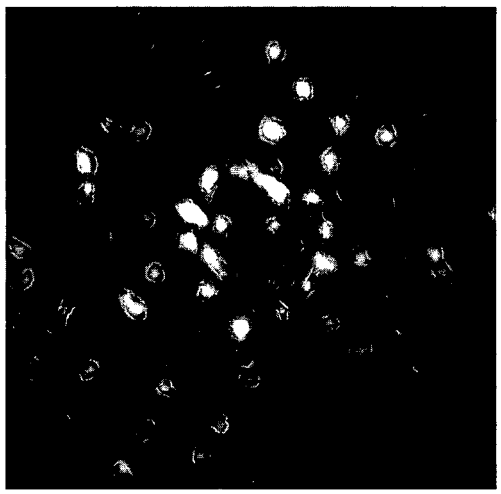
Figure 6:
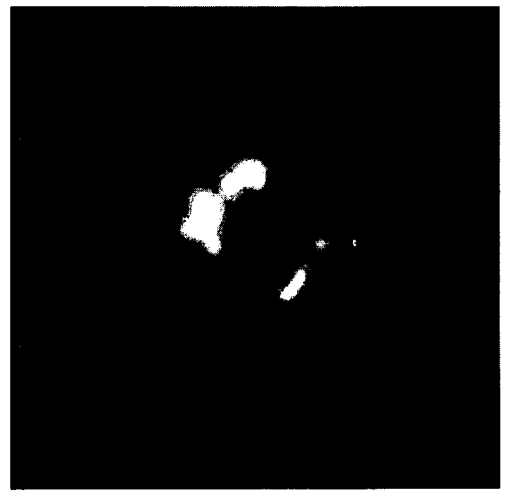

Referring to FIGS. 3-6, four examples are shown illustrating the feature extraction/denoising capability of the present invention. FIG. 3 shows how the 3D wavelet-based filter and method extracts a pair of mathematically constructed helices from a noisy background, even at low values of signal-to-noise. FIGS. 4 and 5 show operation of the filter in a typical noisy biological environment to identify positively stained microtubules. And FIG. 6 shows filtering to visualize a negatively stained gamma-tubulin ring complex (gturc). In all of these cases, except FIG. 3, the filter is applied to a 3D electron microscope tomographically reconstructed volume containing the respective structural features.

In FIG. 3, two analytically constructed helices (strand diameter ~6 voxels) are embedded in varying amounts of Gaussian noise. The left column shows original image data with signal-to-noise ratios (SN) equal to 8, 2, 1, and 0.5. The images in the right column are obtained by using the 3D wavelet filter and method of the present invention, with a 6 voxel spatial scale (a=b=c=6 in Eq. (5) which is the approximate diameter of the helical fiber), to denoise the corresponding data volumes in the left column. Each image in the figure is a maximum intensity volume projection. As can be seen, the two helices are evident, even at the lowest SN. This example demonstrates that the filter can extract structure from a noisy environment, for constructed data.

In FIGS. 4 and 5, proper operation of the image filtering method has also been verified by analyzing 3D-tomographs of microtubules. In FIG. 4, the upper left image (maximum intensity volume projection) shows data that was obtained using EM tomography. Microtubules (~30 nm characteristic diameter) throughout a noisy background and a centriole in the upper right corner are visible. Two additional views are shown in the left column which were obtained by rotating the volume. The upper right image shows the data from the upper left image filtered using Eq. (5) with a 10 voxel spatial scale (a=10, ~28 nm) that corresponds approximately to the diameter of a microtubule. Additional rotated views are shown below the upper images in each column. The filter extracts microtubules from the noisy background, while excluding the larger centriole, whose substructural units have a characteristic size approximately three times that of a microtubule. 3D stereo overlays (not shown here) confirm that the extracted microtubules exist in the original data.

FIG. 5 shows the unfiltered data (upper left) and filtered data, as a function of the spatial scale that is used: wavelet sizes equal to 5, 10, 15, 25, and 30 voxels, which correspond to 14, 28, 42, 69, and 83 nm. As the spatial scale increases, the correlations change. At 14 nm and lower (not shown), there are no clearly discernable features. At 28 nm, microtubules are visible. As the spatial scale continues to increase (e.g. 69 nm and 83 nm), the microtubules disappear and the centriole becomes the dominant feature, as expected, as shown in the upper right corner.

In FIG. 6, the upper left image (maximum intensity volume projection) in FIG. 6 shows data that was obtained using EM tomography (3.8 Å voxel size). A gturc has a characteristic 8 nm "lock washer" shaped structure, which is not apparent in a maximum intensity projection of the data (upper left image). The images labeled 5,10, and 20 voxels, correspond to wavelet sizes equal to 1.9, 3.8, and 7.5 nm. The 7.5 nm wavelet (lower right) clearly shows the lock washer shape.

It is appreciated that although this filter is particularly useful for biological applications, it is generally applicable to any 3D (or 2D) data set of a wide variety of applications. One example is for non-destructive evaluation applications, e.g. identifying internally cracked pipes from 3D tomography, and another application is identifying the location of tissue lesions due to focused ultrasonic surgery. This is in order to guide beam location as there is no current easy and quick way to track the development of the lesions that develop as surgery proceeds.

While particular operational sequences, materials, parameters, and particular embodiments have been described and or illustrated, such are not intended to be limiting. Modifications and changes may become apparent to those skilled in the art, and it is intended that the invention be limited only by the scope of the appended claims.

We claim:

1. A method in a computer system for filtering 2D or 3D image data, comprising:
   providing a 3D continuous wavelet transform having a single unknown parameter which is a wavelet width, (a), necessary for transforming a dataset;
   receiving an input value for the wavelet width, (a);
   using the 3D continuous wavelet transform and the input value of the wavelet width, (a), to transform a set of up to 3D image data into a correlation image representing correlation strengths, with respect to the wavelet width, (a), as a function of spatial position; and
   graphically rendering the correlation image to be viewed by a user, whereby high correlation structural features can be discernable by the user in the correlation image.

2. The method of claim 1,
   wherein the wavelet width, (a), is a characteristic linear dimension of a known structural feature of interest.

3. The method of claim 1,
   wherein the wavelet width, (a), is measured in voxels.

4. The method of claim 1,
   wherein the input value for the wavelet width is provided by a user.

5. The method of claim 1,
   wherein the 3D continuous wave transform is adapted to produce only positive correlations.

6. The method of claim 1,
   wherein the 3D continuous wave transform has at least partial invariance to rigid body rotations.

7. The method of claim 6,
   wherein rotational invariance is approximated in the 3D continuous wave transform by using only cubical wavelets and averaging over angles.

8. The method of claim 1, wherein the 3D continuous wave transform is constructed from three 1D wavelet kernels, Ψ, each defined as follows:

$$\Psi(\zeta) = \frac{1}{a'} \text{ for } |\zeta| \leq \frac{1}{2} \text{ and } \Psi(\zeta) = \frac{-1}{2a'} \text{ for } \frac{1}{2} < |\zeta| \leq \frac{3}{2}$$

where $\zeta=(x-x')/a'$ for the x-domain (a'=a), $\zeta=(y-y')/a'$ for the y-domain (a'=b), and $\zeta=(z-z')/a'$ for the z-domain (a'=c), and a=b=c.

9. The method of claim 1,
   further comprising, upon viewing the correlation image and determining that the graphic rendering is sub-optimal, adjusting the input value of the wavelet width, (a) to graphically re-render the correlation image.

10. The method of claim 1,
    wherein the 3D continuous wave transform is the function W(x,y,z,a), with:

$$W(x, y, z, a) = \frac{1}{4}(W_{sym}(x, y, z, a, 0, x) + W_{sym}(x, y, z, a, \pi/4, x) + W_{sym}(x, y, z, a, \pi/4, y) + W_{sym}(x, y, z, a, \pi/4, z))$$

-continued $$W_{sym}(x, y, z, a, \phi, i) = \frac{1}{6} R_i^{-1}(\phi) \sum_{\substack{x,y,z \\ perm}} \overline{W}(x, y, z, a, a, a, \phi, i);$$

$$\overline{W}(x, y, z, a, b, c, \phi, i) =$$

$$H\left[\int \Psi\left(\frac{z-z'}{c}\right) H\left[\int \Psi\left(\frac{y-y'}{b}\right) H\left[\int \Psi\left(\frac{x-x'}{a}\right) R_i(\phi) f(x', y', z') dx'\right] dy'\right] dz'\right]$$

where H[q]=q for q>0 and H[q]=0 for q≦0, to produce only positive correlations; and $$\Psi(\zeta) = \frac{1}{a'} \text{ for } |\zeta| \leq \frac{1}{2} \text{ and } \Psi(\zeta) = \frac{-1}{2a'} \text{ for } \frac{1}{2} < |\zeta| \leq \frac{3}{2}$$

where ζ=(x−x')/a' for the x-domain (a'=a), ζ=(y−y')/a' for the y-domain (a'=b), and ζ=(z−z')/a' for the z-domain (a'=c), and a=b=c.

11. A computer system for filtering 2D or 3D image data, comprising:
means for receiving an input value for a wavelet width, (a);
a 3D continuous wave transform component having a single unknown parameter which is a wavelet width, (a), necessary for transforming a dataset, wherein upon receiving the input value of the wavelet width, (a) the transform component is adapted to transform a set of up to 3D image data into a correlation image representing correlation strengths, with respect to the wavelet width, (a), as a function of spatial position; and
means for graphically rendering the correlation image to be viewed by a user, whereby high correlation structural features can be discernable by the user in the correlation image.

12. The computer system of claim 11, wherein the wavelet width, (a), is a characteristic linear dimension of a known structural feature of interest.

13. The computer system of claim 11, wherein the wavelet width, (a), is measured in voxels.

14. The computer system of claim 11, wherein the input value for the wavelet width is provided by a user.

15. The computer system of claim 11, wherein the 3D continuous wave transform is adapted to produce only positive correlations.

16. The computer system of claim 11, wherein the 3D continuous wave transform has at least partial invariance to rigid body rotations.

17. The computer system of claim 16, wherein rotational invariance is approximated in the 3D continuous wave transform by using only cubical wavelets and averaging over angles.

18. The computer system of claim 11, wherein the 3D continuous wave transform is constructed from three 1D wavelet kernels, Ψ, each defined as follows:

$$\Psi(\zeta) = \frac{1}{a'} \text{ for } |\zeta| \leq \frac{1}{2} \text{ and } \Psi(\zeta) = \frac{-1}{2a'} \text{ for } \frac{1}{2} < |\zeta| \leq \frac{3}{2}$$

where ζ=(x−x')/a' for the x-domain (a'=a), ζ=(y−y')/a' for the y-domain (a'=b), and ζ=(z−z')/a' for the z-domain (a'=c), and a=b=c.

19. The computer system of claim 11, wherein the 3D continuous wave transform is the function W(x,y,z,a), with:

$$W(x, y, z, a) = \frac{1}{4}(W_{sym}(x, y, z, a, 0, x) +$$

$$W_{sym}(x, y, z, a, \pi/4, x) + W_{sym}(x, y, z, a, \pi/4, y) + W_{sym}(x, y, z, a, \pi/4, z))$$

$$W_{sym}(x, y, z, a, \phi, i) = \frac{1}{6} R_i^{-1}(\phi) \sum_{\substack{x,y,z \\ perm}} \overline{W}(x, y, z, a, a, a, \phi, i);$$

$$\overline{W}(x, y, z, a, b, c, \phi, i) =$$

$$H\left[\int \Psi\left(\frac{z-z'}{c}\right) H\left[\int \Psi\left(\frac{y-y'}{b}\right) H\left[\int \Psi\left(\frac{x-x'}{a}\right) R_i(\phi) f(x', y', z') dx'\right] dy'\right] dz'\right]$$

where H[q]=q for q>0 and H[q]=0 for q≦0, to produce only positive correlations; and $$\Psi(\zeta) = \frac{1}{a'} \text{ for } |\zeta| \leq \frac{1}{2} \text{ and } \Psi(\zeta) = \frac{-1}{2a'} \text{ for } \frac{1}{2} < |\zeta| \leq \frac{3}{2}$$

where ζ=(x−x')/a' for the x-domain (a'=a), ζ=(y−y')/a' for the y-domain (a'=b), and ζ=(z−z')/a' for the z-domain (a'=c), and a=b=c.

20. An article of manufacture comprising:
a computer readable medium having computer readable program code means embodied therein for filtering 2D or 3D image data, the computer readable program code means in said article of manufacture comprising:
computer readable program code means for causing a computer to receive an input value for a wavelet width, (a);
computer readable program code means for causing the computer to include the input value for the wavelet width (a) to a 3D continuous wave transform where only the wavelet width, (a), is unknown, and to use the 3D continuous wave transform to transform a set of up to 3D image data into a correlation image representing correlation strengths, with respect to the wavelet width, (a), as a function of spatial position; and computer readable program code means for graphically rendering the correlation image to be viewed by a user, whereby high correlation structural features can be discernable by the user in the correlation image.

* * * * *

UNITED STATES PATENT AND TRADEMARK OFFICE
CERTIFICATE OF CORRECTION

| | | |
|---|---|---|
| PATENT NO. | : 7,412,103 B2 | Page 1 of 1 |
| APPLICATION NO. | : 10/970822 | |
| DATED | : August 12, 2008 | |
| INVENTOR(S) | : William C. Moss et al. | |

It is certified that error appears in the above-identified patent and that said Letters Patent is hereby corrected as shown below:

Title Page, Item [73] Assignee should read: Lawrence Livermore National Security, LLC, Livermore, CA (US) --and The Regents of the University of California, Oakland, CA (US)--

Signed and Sealed this
Nineteenth Day of July, 2011

David J. Kappos
*Director of the United States Patent and Trademark Office*